(12) United States Patent
Luo et al.

(10) Patent No.: US 6,256,433 B1
(45) Date of Patent: Jul. 3, 2001

(54) EXPANDABLE INTERLEAVING OPTICAL ADD/DROP FILTER MODULE

(75) Inventors: Huali Luo; Joseph C. Chon, both of Fremont; Jerry R. Bautista, Castro Valley; Sheau-Sheng Chen, Fremont, all of CA (US)

(73) Assignee: Wavesplitter Technologies, Inc., Fremont, CA (US)

( * ) Notice: Subject to any disclaimer, the term of this patent is extended or adjusted under 35 U.S.C. 154(b) by 0 days.

(21) Appl. No.: 09/405,027

(22) Filed: Sep. 24, 1999

(51) Int. Cl.$^7$ .................................................. G02B 6/28

(52) U.S. Cl. .............................. 385/24; 359/124; 385/17

(58) Field of Search .................................. 385/24, 37, 43, 385/17; 359/124, 127, 130

(56) References Cited

U.S. PATENT DOCUMENTS

| | | | |
|---|---|---|---|
| 5,488,500 | * 1/1996 | Glance | 359/127 |
| 5,978,114 | * 11/1999 | Clark et al. | 359/115 |
| 6,002,503 | * 12/1999 | Mizrahi | 359/124 |
| 6,038,045 | * 3/2000 | Sotom et al. | 359/128 |
| 6,141,467 | * 10/2000 | Doerr | 385/24 |

* cited by examiner

Primary Examiner—Georgia Epps
Assistant Examiner—Gary O'Neill
(74) Attorney, Agent, or Firm—Skjerven Morrill MacPerson LLP; Tom Chen (57) ABSTRACT

An optical add/drop filter (OADF) module is provided that is capable of only utilizing one filter to drop and add multiple channels from a multiplexed signal. In one embodiment, a demultiplexer separates the input signal into groups of signals or channels to be dropped. This group of channels is coupled to one input of a 2×2 interleaving OADF, which in one embodiment is an unbalanced Mach-Zehnder Interferometer, while another group of channels to be added back to the multiplexed signal is coupled to the other input. One output of the OADF drops one group of channels, while the other output transmits the added group of channels to an input of a multiplexer, which combines the group of added channels with the other groups of channels from the outputs of the demultiplexer. In another embodiment, a multi-window filter formed from an unbalanced Michelson Interferometer outputs two signals, each having either odd or even wavelength signal components. The signal to be dropped is input back to an optical circulator, which drops the signal from an exit port. The other signal is input to a second optical circulator, which combines the two signals into a single signal with both even and odd wavelength signals. Consequently, large numbers of channels can be dropped and added using only a single filter, thereby reducing leakage loss due to propagation through multiple filters.

15 Claims, 7 Drawing Sheets

EXPANDABLE INTERLEAVING OPTICAL ADD/DROP FILTER MODULE

BACKGROUND OF THE INVENTION

1. Field of the Invention

The present invention relates to optical filters and, in particular, to optical add/drop filters.

2. Discussion of the Related Art

With existing fiber optic networks, there is often the need to increase information transmission capacity. However, both physical and economic constraints can limit the feasibility of increasing transmission capacity. For example, installing additional fiber optic cable to support additional signal channels can be cost prohibitive, and electronic system components may impose physical limitations on the speed of information that can be transmitted. One way to increase the capacity of an existing fiber optic link without modification to the fiber itself is by multiplexing multiple signals via wavelength division multiplexers (WDMs). The use of WDMs provides a simple and economical way to increase the transmission capacity of fiber optic communication systems by allowing multiple wavelengths to be transmitted and received over a single optical fiber through signal wavelength multiplexing and demultiplexing. The demultiplexed signals can then be routed to the final destinations.

Dense WDMs (DWDMs) can be utilized to further increase information transmission capacity. In a DWDM system, multiple optical signals, each having a different channel or wavelength, are multiplexed to form an optical signal comprised of the individual optical signals. The signal is transmitted over a single waveguide and demultiplexed at a receiving end such that each channel wavelength is individually routed to a designated receiver. Through the use of optical amplifiers, such as doped fiber amplifiers, optical channels can be directly amplified simultaneously, thereby facilitating the use of DWDM systems in long-distance optical systems. DWDMs can be made using techniques, such as disclosed in commonly-owned U.S. Pat. No. 5,809,190, which is incorporated by reference in its entirety.

Figure 1:
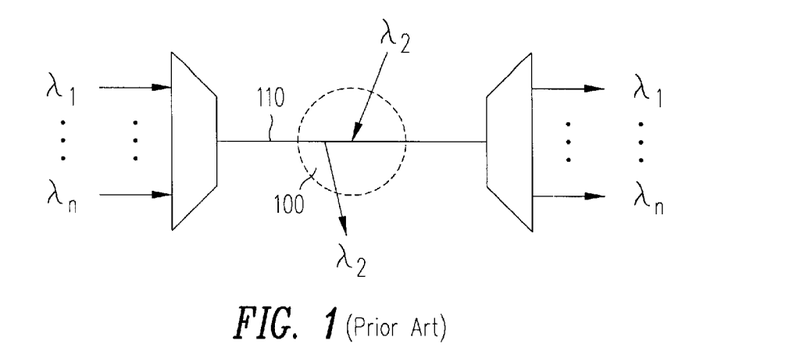
FIG. 1 shows a generalized wavelength division multiplexer (WDM) system having an optical add/drop filter (OADF) module.

Because DWDMs can multiplex and demultiplex large numbers of communication channels, e.g., 8, 16, or even 32 discrete communication channels onto a single optic fiber, and transmit these channels over long distances, some of the channels may be desired at intermediate nodes before demultiplexing. Selected channels from the multiplexed signal are extracted or "dropped" and routed to desired nodes for use, such as for transmission to users coupled to the node. However, other nodes along the single optic cable path or at the demultiplexing node may also want to utilize the extracted signals. In addition, intermediate nodes may generate signals for transmission along the single optic cable. Accordingly, extracted or newly generated signals are inserted or "added" into the multiplexed signal. This extracting and inserting of optical signals is generally referred to as add/drop multiplexing and is typically carried out with devices such as optical add/drop filters (OADFs) or OADF modules. FIG. 1 shows a generalized WDM system having an OADF module 100. Signals having wavelengths $\lambda_1$, $\lambda_2$, ..., $\lambda_N$, are multiplexed onto a single optical fiber 110. OADF module 100 drops a signal at the selected wavelength, e.g., $\lambda_2$, for routing to desired destinations. OADF module 100 also adds back the signal at wavelength $\lambda_2$ to the multiplexed signal for continued transmission. The multiplexed signal is then demultiplexed into individual signals at wavelengths $\lambda_1, \lambda_2, \ldots, \lambda_N$. Note that any number of OADF modules 100 can be inserted along the multiplexed signal.

Figure 2:
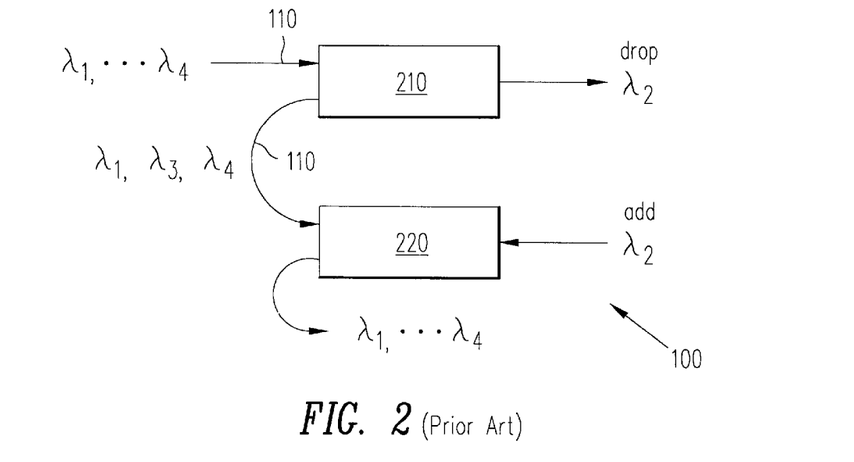
FIG. 2 shows one conventional embodiment of the OADF module of FIG. 1.

One type of OADF module 100 is shown in FIG. 2, which utilizes two non-absorbing interference filters 210 and 220. Filters 210 and 220 comprise dielectric layers or coatings having refraction indices and thicknesses so that filters 210 and 220 transmit a certain portion of the spectrum of the incident radiation and reflect the remaining portion. For example, filter 210 receives a multiplexed optical signal having wavelengths $\lambda_1$, $\lambda_2$, $\lambda_3$, and $\lambda_4$, the dielectric coating transmits the signal to be extracted, e.g., at $\lambda_2$, and reflects all other signals, e.g., at $\lambda_1$, $\lambda_3$, and $\lambda_4$, to filter 220. Filter 220 also receives the signal to be inserted, e.g., at $\lambda_2$, and combines the signal with the multiplexed signal.

Figure 3:
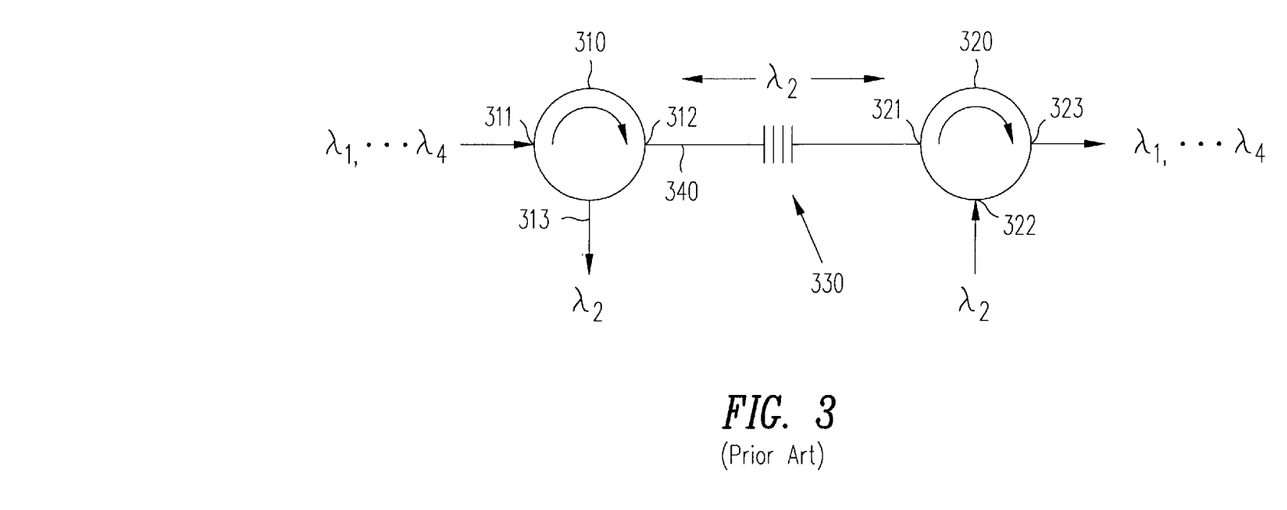
FIG. 3 shows another conventional embodiment of the OADF module of FIG. 1.

FIG. 3 shows another type of OADF module utilizing two optical circulators 310 and 320 and fiber Bragg grating 330 coupled between circulators 310 and 320. The multiplexed optical signal, e.g., at wavelengths $\lambda_1$, $\lambda_2$, $\lambda_3$, and $\lambda_4$, enters optical circulator 310 at an input port 311 and is transmitted along an optical fiber 340 toward fiber grating 330 via an input/output port 312. Fiber grating 330 reflects the signal to be extracted, e.g., at $\lambda_2$, back to optical circulator 310 via input/output port 312, where the signal is dropped at an output port 313. Meanwhile, the unreflected portion of the multiplexed signal, i.e., channels at $\lambda_1$, $\lambda_3$, and $\lambda_4$, travel through fiber grating 330 and enter optical circulator 320 via input/output port 321. A signal to be inserted, such as a signal at $\lambda_2$, is inserted to optical circulator 320 at input port 322. This signal is transmitted back along fiber 340 to fiber grating 330, where it is reflected back to circulator 320 and inserted into the multiplexed signal. Thus, a signal with all channel components at $\lambda_1$, $\lambda_2$, $\lambda_3$, and $\lambda_4$, is transmitted out of circulator 320 at an output port 323.

While the OADF modules discussed above are effective for dropping and adding a single optical channel, problems arise when more than one optical channel is dropped and added from the multiplexed signal. One way to add and drop multiple optical signals is to add additional OADF modules to the single OADF modules of FIGS. 2 and 3. For example, each of the additional OADF modules can have dielectric coatings that transmit signals at a distinct wavelength or fiber gratings that only reflect signals at a particular wavelength. Thus, another OADF module can be coupled to the output of the single OADF module of FIGS. 2 and 3, where the second OADF module drops the channel at $\lambda_1$ at one filter or circulator and adds a channel at $\lambda_1$ at another filter or circulator. Accordingly, by cascading N OADF modules, N channels can be dropped and added along the multiplexed signal. However, where N is large, such as with DWDM applications, the system can be large and costly, requiring large numbers of interference filters or optical circulators and fiber gratings. In addition, the dielectric coatings and fiber gratings do not completely reflect or pass signals. Therefore, the resulting multiplexed signal out of each OADF module experiences some signal loss, which compounds as the signal travels through each subsequent OADF module. As a result, systems adding and dropping many channels can experience substantial signal degradation.

Figure 4:
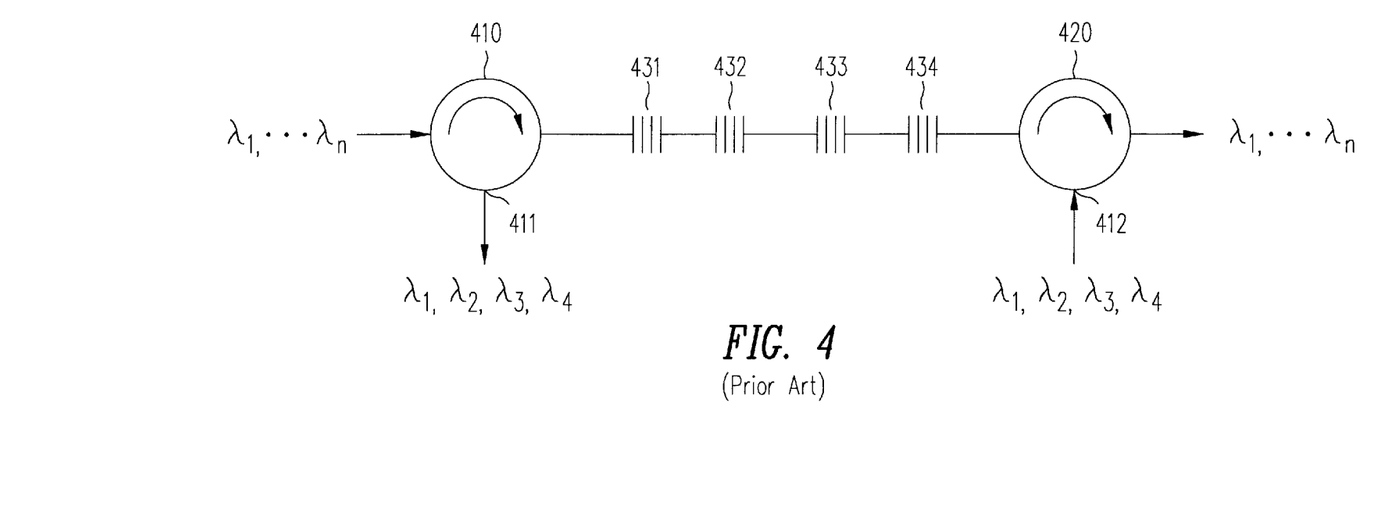
FIG. 4 shows expanding the OADF module of FIG. 3 for adding and dropping more channels.

FIG. 4 shows an OADF module capable of adding and dropping multiple channels, but having only two optical circulators 410 and 420. The OADF module is similar to that of FIG. 3, except that each optical circulator drops or adds multiple channels via an exit port 411 or input port 412, respectively, and that multiple fiber gratings are coupled along the optic fiber between the two circulators. For example, optical circulator 410 drops channels at $\lambda_1$, $\lambda_2$, $\lambda_3$, and $\lambda_4$ from an N-channel multiplexed signal, and optical circulator 420 adds channels at $\lambda_1$, $\lambda_2$, $\lambda_3$, and $\lambda_4$. Fiber Bragg gratings 431–434 are tuned to reflect signals at $\lambda_1$, $\lambda_2$, $\lambda_3$, and $\lambda_4$, respectively. Because fiber gratings 431–434 do not completely reflect signals at the tuned wavelengths, leakage components at the tuned wavelengths pass through the associated fiber gratings. These adverse effects increase as the number of channels to be added and dropped increases, which necessitates an increased number of tuned fiber Bragg gratings.

Accordingly, an optical add/drop filter is desired that are capable of adding and dropping multiple signals without the disadvantages of conventional OADF modules discussed above.

SUMMARY OF THE INVENTION

In accordance with the one embodiment of the present invention, an expandable optical add/drop filter (OADF) module comprises a $1 \times 2^m$ demultiplexer, a $2^m \times 1$ multiplexer, and at least one $2 \times 2$ interleaving OADF (IOADF) coupled between an output of the demultiplexer and an input of the multiplexer. The demultiplexer separates n-channel multiplexed input signals into $2^m$ signal groups, with each group containing k channels or signal components, where $k=n/2^m$. Each group of signals to be dropped is coupled to one input of a $2 \times 2$ IOADF, with the other input being coupled to a group of signals to be added (which is the same as the group of signals to be dropped). One output of each $2 \times 2$ IOADF outputs the group of signals to be dropped, while the other output transmits the group of signals to be added to an input of a $2^m \times 1$ multiplexer. The group of signals from the $1 \times 2^m$ demultiplexer that are not dropped are coupled to the other inputs of the $2^m \times 1$ multiplexer, which combines the $2^m$ group of signals back to an n-channel multiplexed signal. The IOADF allows multiple signals k to be added and dropped using only one filter, thereby decreasing the size and signal loss due to leakage through multiple filters, especially when k is large.

In one embodiment, the demultiplexer and multiplexer are wavelength division multiplexers (WDMs) formed by cascading $1 \times 2$ WDMs, which can be unbalanced Mach-Zehnder Interferometers (MZIs). Depending on the number of input channels n and the number of signal groups $2^m$ to be demultiplexed, the $1 \times 2$ WDMs can be cascaded to form $1 \times 4$, $1 \times 16$, and larger WDMs, as necessary. The desired group or groups of signals to be dropped are coupled to an input of the IOADF. In one embodiment, the IOADF can be an unbalanced MZI with one input port coupled to the group of k signals to be dropped and the other input port coupled to the same group of k signals to be added. The MZI provides to one output port the group of k signals that are dropped and provides to the other output port the group of k signals that were added, which are coupled to one of the $2^m$ inputs of the $2^m \times 1$ multiplexer. Because the $1 \times 2^m$ demultiplexer and $2^m \times 1$ multiplexer can be expanded (e.g., by cascading additional $1 \times 2$ WDMs) or reduced (e.g., by removing stages of $1 \times 2$ WDMs), the present invention further provides flexibility to accommodate the desired grouping of signals to be added and dropped.

In another embodiment of the present invention, an OADF module comprises two three-port optical circulators and an unbalanced Michelson Interferometer coupled therebetween. The Michelson Interferometer is formed from a fused-fiber coupler in which light having signal components or channels at wavelengths $\lambda_1$ to $\lambda_n$ entering an input fiber is decoupled as it exits the coupling region. The two signals then travel along two fibers of differing optical path length until they reach a reflective coating at the end of each fiber. At this time, the light is reflected back toward the coupling region, where interference occurs between the two signals from the two fibers, and exits the coupling region. The path length difference results in constructive and destructive interference of light as it travels through the coupling region, resulting in complementary signals at the output of the coupling region. One set of signals (e.g., $\lambda_2, \lambda_4, \ldots, \lambda_n$, if n is even) travels back to the first circulator, which drops the set of signals through an exit port. The other set of signals (e.g., $\lambda_1, \lambda_3, \ldots, \lambda_{n-1}$, if n is even) is transmitted to a first input/output (I/O) port of the second circulator. The set of signals that were dropped by the first circulator is coupled to a second I/O port of the second circulator to insert the dropped signals back into the signal stream. The third I/O port then outputs the multiplexed signal of channels at $\lambda_1, \lambda_2, \ldots, \lambda_n$. Consequently, a large number of even or odd channels can be dropped and added using only one filter.

This invention will be more fully understood in light of the following detailed description taken together with the accompanying drawings.

BRIEF DESCRIPTION OF THE DRAWINGS

Use of the same reference numbers in different figures indicates similar or like elements.

DETAILED DESCRIPTION

Figure 5:
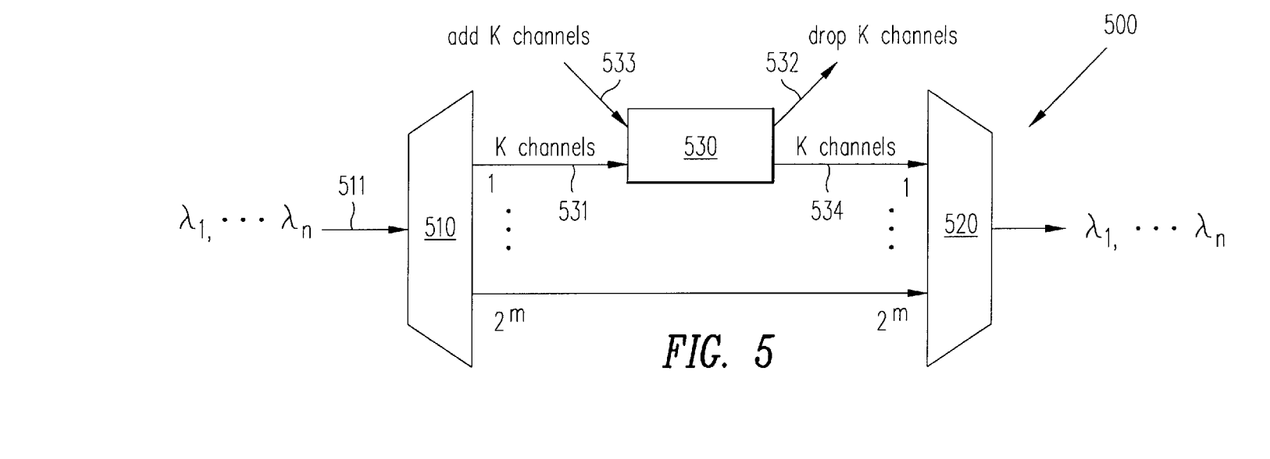
FIG. 5 shows a general block diagram of an OADF module according to one embodiment of the present invention.

FIG. 5 is a general block diagram of an expandable optical add/drop filter (OADF) module 500 according to one embodiment of the present invention. OADF module 500 includes a 1×2$^m$ demultiplexer 510, a 2$^m$×1 multiplexer 520, and a 2×2 interleaving OADF (IOADF) 530 coupled between demultiplexer 510 and multiplexer 520 for adding and dropping k signals from a multiplexed signal of n signals, where k=n/2$^m$. IOADF is capable of dropping and adding a large number of k signals or channels, and thus, only a single filter is needed to add/drop multiple channels, which is contrary to conventional OADF modules requiring multiple filters. A multiplexed optical signal having n carrier components or channels at wavelengths $\lambda_1$ to $\lambda_n$ are input to demultiplexer 510 via an input optical fiber 511, where demultiplexer 510 separates the signal into 2$^m$ groups of signals containing k channels each, where k=n/2$^m$. The one or more of the 2$^m$ groups of signals to be dropped and added is each coupled to 2×2 IOADF 530 via an input optical fiber 531. IOADF 530 drops the group of k channels via a drop optical fiber 532, adds back the group of k channels via an add optical fiber 533, and transmits the group of k channels to one of the 2$^m$ input terminals of 2$^m$×1 multiplexer 520 via an output optical fiber 534. The k dropped channels can then be routed to desired destinations. The other 2$^{m-1}$ groups of k channels are transmitted to 2$^{m-1}$ input terminals of multiplexer 520, for re-combining with the group of k channels from IOADF 530 onto a single multiplexed signal with n wavelengths $\lambda_1$ to $\lambda_n$. As a result, k channels, which can be very large, can be added and dropped utilizing only a single filter, instead of multiple filters necessary with conventional OADF modules.

Figure 6:
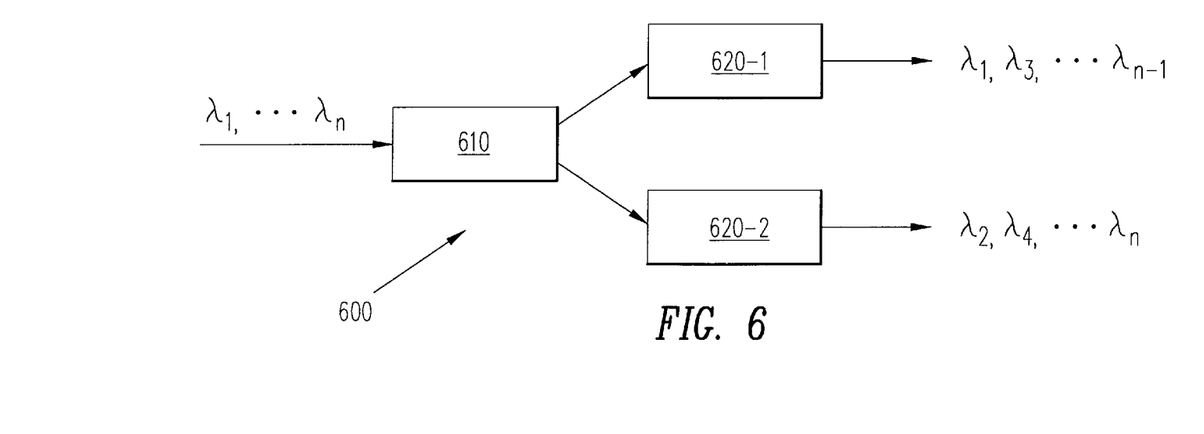
FIG. 6 shows a $1 \times 2$ wavelength division multiplexer (WDM) for use in the OADF module of the present invention.

One type of demultiplexer 510 (or multiplexer 520) is based on a 1×2 wavelength division multiplexer (WDM) 600, shown in FIG. 6. WDM 600 includes a first stage having a first interferometric device 610 with a wavelength separation or channel spacing of $\Delta\lambda$. Each of the two output branches of device 610 are coupled to an input branch of one of two second interferometric devices 620-1 and 620-2 in a second stage, with both devices 620-1 and 620-2 having the same wavelength separation as the first device in the first stage (i.e., $\Delta\lambda$). The resulting signals from devices 620-1 and 620-2 in the second stage (also referred to herein as a redundancy stage) have lower sidelobes than the signals at the output branches of device 610, as disclosed in commonly-owned U.S. patent application Ser. No. 09/249,899, entitled "Expandable Wavelength Division Multiplexer Based on Interferometric Devices", filed Feb. 16, 1999, which is incorporated by reference in its entirety.

Figure 7:
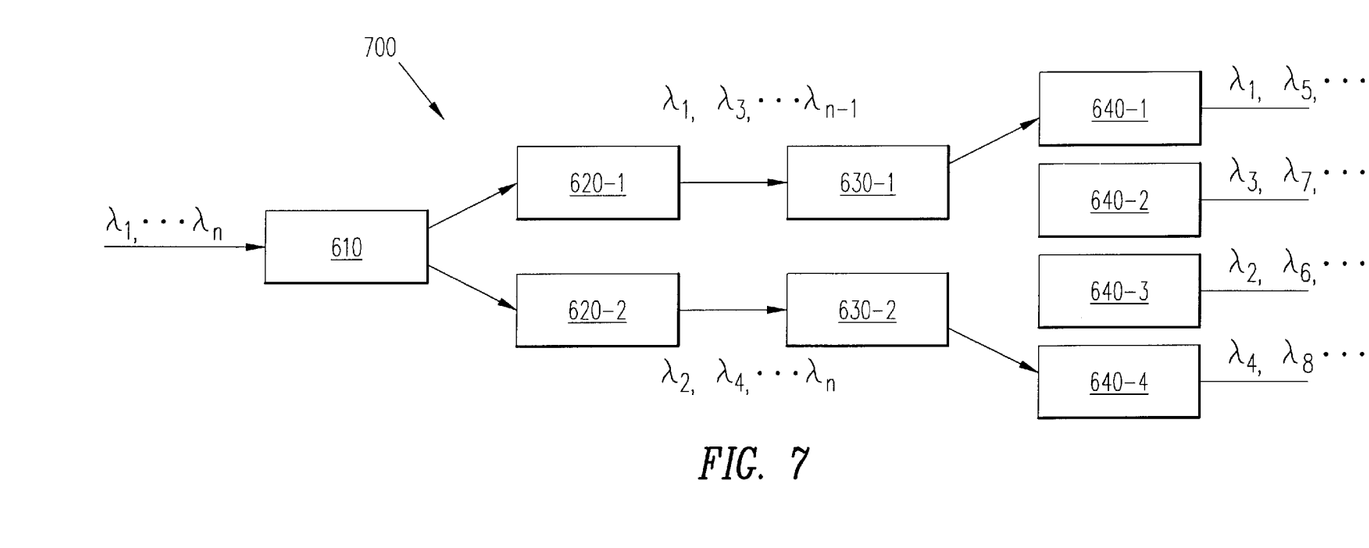
FIG. 7 shows a $1 \times 4$ WDM formed from the $1 \times 2$ WDM of FIG. 6.

The 1×2 WDM 600 of FIG. 6 can be utilized as its owned separate device or WDM 600 can be cascaded with other 1×2 WDMs to form larger WDMs, such as 1×4, 1×16, 1×32, and larger WDMs, as disclosed in the above-referenced U.S. patent application Ser. No. 09/249,899. FIG. 7 shows a 1×4 WDM 700 formed with three 1×2 WDMs 600 of FIG. 6. Each of the two output branches of devices 620-1 and 620-2 of FIG. 6 (having channel spacing of $\Delta\lambda$) is coupled to an input of one of two third interferometric devices 630-1 and 630-2 in a third stage, both devices 630-1 and 630-2 having a wavelength separation of 2$\Delta\lambda$. The two output branches of device 630-1 are coupled to input branches of two of four fourth interferometric devices 640-1 and 640-2 in a fourth stage having the same wavelength separation as the devices in the third stage (i.e., 2$\Delta\lambda$). Similarly, the two output branches of device 630-2 are coupled to input branches of the other two of the four fourth interferometric devices 640-3 and 640-4, also having wavelength separation of 2$\Delta\lambda$. Thus, the fourth stage is another redundancy stage, which further suppresses the sidelobes and reduces the cross-talk from pass and stop channels. Note that in other embodiments, the redundancy stages, e.g., devices 620-1, 620-2, and 640-1 to 640-4 in FIG. 7, can be omitted. Although this will increase the cross-talk between channels, the cost and size of the WDM will decrease.

Figure 8:
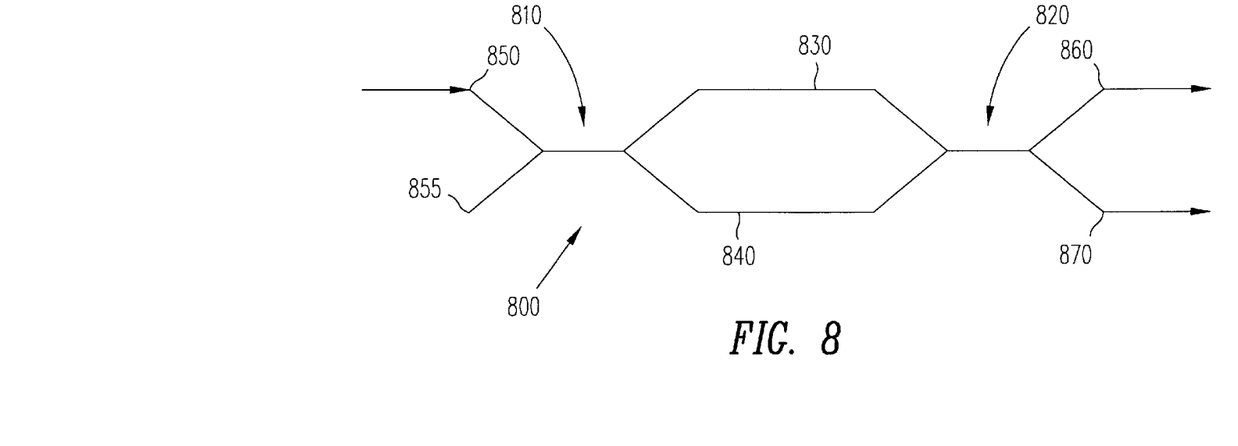
FIG. 8 shows an unbalanced Mach-Zehnder Interferometer (MZI) for use in the WDMs of FIGS. 6 and 7 and as the interleaving OADF of FIG. 5.

The interferometric devices of FIGS. 6 and 7 are preferably unbalanced Mach-Zehnder Interferometers (MZIs), such as disclosed in commonly-owned U.S. patent application Ser. No. 09/034,895, entitled "A Fused-Fiber Multi-Window Wavelength Division Multiplexer Using An Unbalanced Mach-Zehnder Interferometer and Method of Making Same", which is incorporated by reference in its entirety. FIG. 8 shows an unbalanced MZI 800, which uses identical first and second fuse-fiber couplers 810 and 820, cascaded together by optically connecting fibers 830 and 840 having different optical path lengths. Couplers 810 and 820 are typically 3-dB couplers, which divide the power entering an input terminal 850 or an input terminal 855 equally between two output terminals 860 and 870. Couplers 810 and 820 are typically formed by biconical tapered fusion (BTF) technology. Other types of interferometric devices are also suitable for use in the WDMs, such as couplers, fiber gratings, array waveguides, and Michelson Interferometers.

Referring back to FIGS. 6 and 7, the WDM of FIGS. 6 and 7 can be expanded to completely demultiplex a particular input signal, or the WDM can be constructed to only partially demultiplex the input signal. For example, for WDM 700, MZIs 610, 620-1, and 620-2 can have wavelength separation capabilities of 0.8 nm ($\Delta\lambda$), and MZIs 630-1, 630-2, and 640-1 to 640-4 can have wavelength separation capabilities of 1.6 nm (2$\Delta\lambda$). The resulting device is then a 1×4 100 GHz DWDM. The input signal has sixteen carrier components or channels (n=16) between 1447.72 nm to 1559.79 nm with a channel separation between each of 0.8 nm or 100 GHz. The output of WDM 700 is four groups (2$^m$, with m=2) of signals containing four signal components each (k=4). The output of MZI 640-1 are signals containing wavelengths at 1547.72 nm, 1550.92 nm, 1554.13 nm, and 1557.36 nm, for a channel separation of approximately 3.2 nm or 400 GHz. The other three wavelength groupings of four at 3.2 nm separations are output from MZIs 640-2 to 640-4. A 4×1 100 GHz DWDM can then be used to re-combine or multiplex the four wavelength groupings onto a single signal having components or channels separated by 0.8 nm or 100 GHz.

Figure 9:
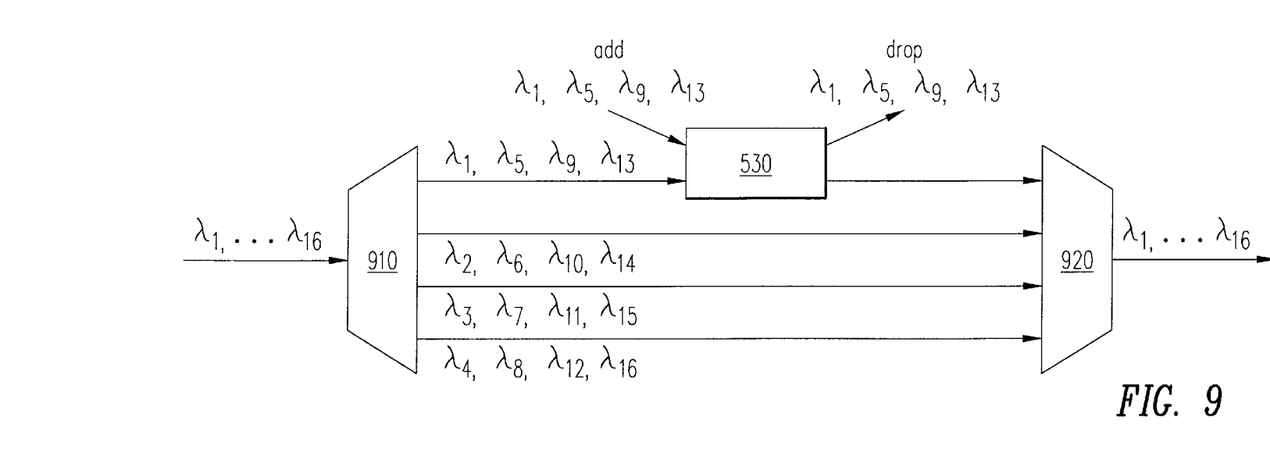
FIG. 9 shows an OADF module for adding and dropping a group of four channels from a signal containing 16 channels.

FIG. 9 shows an IOADF for adding and dropping four channels at wavelengths $\lambda_1$, $\lambda_5$, $\lambda_9$, and $\lambda_{13}$ from a signal having channels at wavelengths $\lambda_1$ to $\lambda_{16}$ (n=16, m=2, k=4). The multiplexed signal enters a 1×4 WDM 910, which separates the signal into four signals, the first signal having channels at wavelengths $\lambda_1$, $\lambda_5$, $\lambda_9$, and $\lambda_{13}$, the second signal having channels at wavelengths $\lambda_2$, $\lambda_6$, $\lambda_{10}$, and $\lambda_{14}$, the third signal having channels at wavelengths $\lambda_3$, $\lambda_7$, $\lambda_{11}$, and $\lambda_{15}$, and the fourth signal having channels at wavelengths $\lambda_4$, $\lambda_8$, $\lambda_{12}$, and $\lambda_{16}$. The first (or dropped) signal is coupled to one input of IOADF 530, and the other input is coupled to the signal to be added (e.g., with components at $\lambda_1$, $\lambda_5$, $\lambda_9$, and $\lambda_{13}$). IOADF 530 outputs (or drops) one signal at wavelengths $\lambda_1$, $\lambda_5$, $\lambda_9$, and $\lambda_{13}$ for routing to desired destinations and outputs another signal (the added signal) to one of the four input terminals of a 4×1 WDM 920 for multiplexing.

IOADF 530 can be an unbalanced Mach-Zehnder Interferometer 800, according to one embodiment, as shown in FIG. 8 and described above. Referring back to FIG. 8, the signals to be dropped are coupled to one input terminal (e.g., 850) and the signal to be added is coupled to the other input terminal (e.g., 855). After coupling, decoupling and traveling along different optical path lengths, coupling, and decoupling, the dropped signal exits one output terminal (e.g., 860) for routing to desired destinations, and the added signal exits the other output terminal (e.g., 870) for multiplexing with other signals. It has been shown that this type of IOADF is capable of effectively dropping and adding multiple channels. Because only one filter is used, the signal loss is greatly reduced when compared to conventional OADFs that require a filter for each channel being added and dropped, particularly when the number of channels being added and dropped is large.

Figure 10:
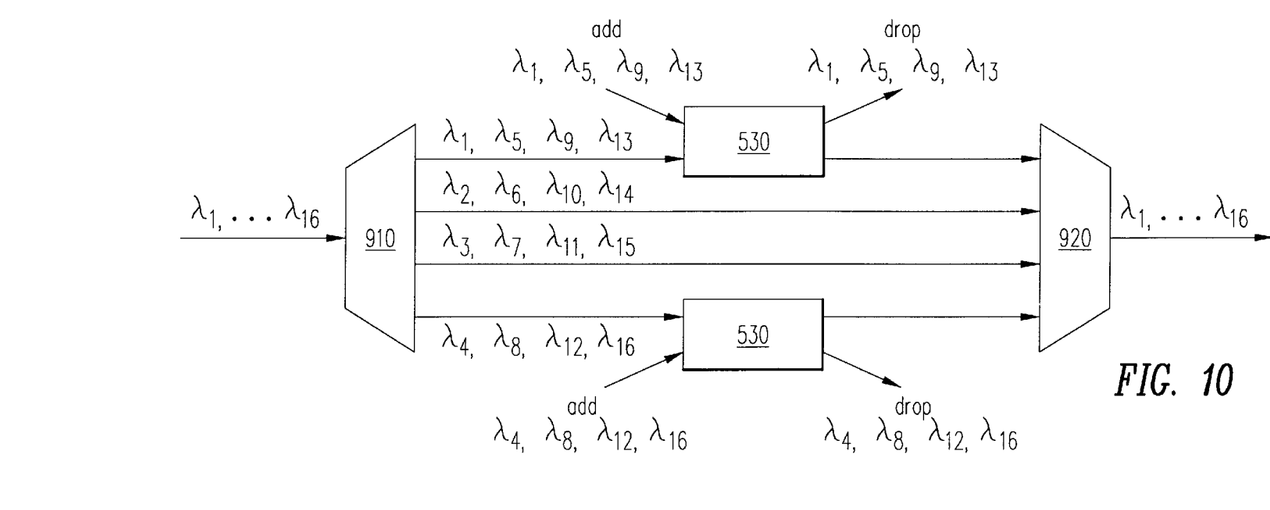
FIG. 10 shows an OADF module for adding and dropping two groups of four channels from a signal containing 16 channels.
Figure 11:
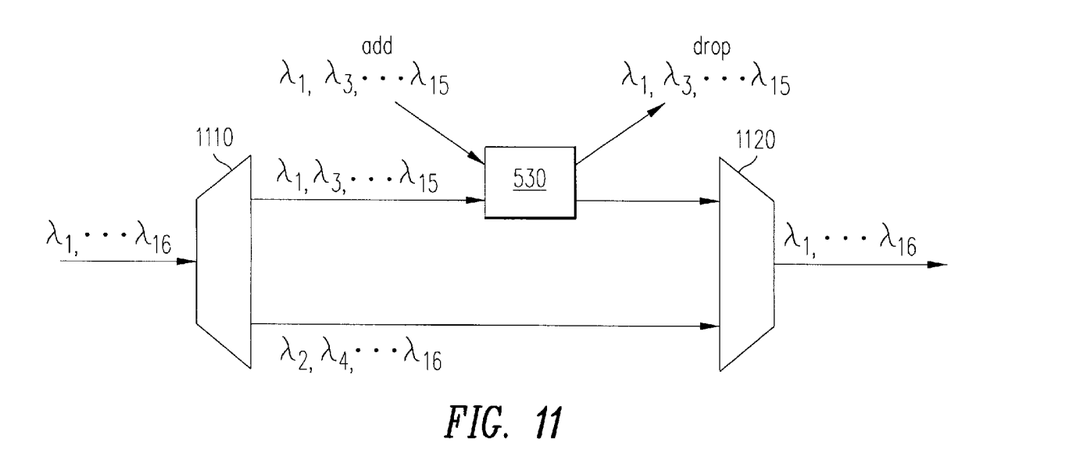
FIG. 11 shows an OADF module for adding and dropping a group of eight channels from a signal containing 16 channels.

Additional groups of signals can also be added and dropped by inserting additional IOADFs 530 between the WDMs. For example, FIG. 10 shows a second IOADF 530 coupled to the fourth group of signals of FIG. 9, which allows channels at wavelengths $\lambda_4$, $\lambda_8$, $\lambda_{12}$, and $\lambda_{16}$ to be added and dropped. Furthermore, because of the flexibility of the WDMs, the OADF module can be customized to add and drop any channel, while minimizing the number of IOADFs required. Continuing the example of FIG. 9, FIG. 11 shows a 1×2 WDM 1110 for separating the 16 channel signal into two signal groups, with the first group with wavelengths at $\lambda_1$, $\lambda_3$, $\lambda_5$, $\lambda_7$, $\lambda_9$, $\lambda_{11}$, $\lambda_{13}$, and $\lambda_{15}$ and the second group with wavelengths at $\lambda_2$, $\lambda_4$, $\lambda_6$, $\lambda_8$, $\lambda_{10}$, $\lambda_{12}$, $\lambda_{14}$, and $\lambda_{16}$. A 2×2 IOADF 530 coupled to the first group will then be able to add and drop the eight signal components. A 2×1 WDM 1120 multiplexes the two signal groups back into a single signal. The structure shown in FIG. 11 is smaller than one based on the OADF module of FIG. 9, which can be modified to add and drop signals from the first group by coupling a second filter to the third group of signals from the 1×4 WDM.

Figure 12:
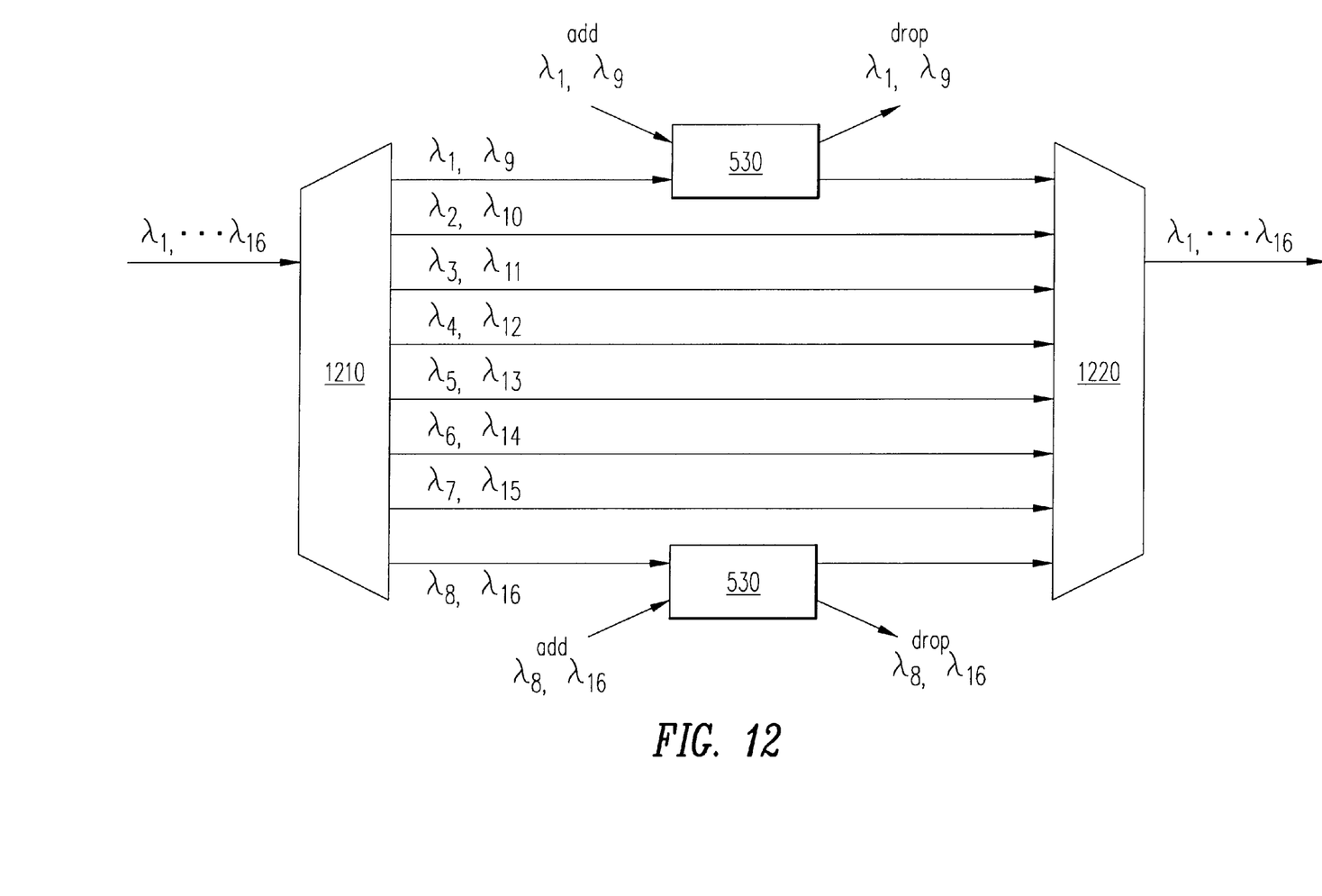
FIG. 12 shows an OADF module for adding and dropping a group of two channels from a signal containing 16 channels.

However, if a smaller group of signals is to be added and dropped, the WDMs can be expanded by cascading additional 1×2 WDMs, which is described in above-referenced U.S. patent application Ser. No. 09/249,899. FIG. 12 shows an example of an OADF module 1200 for adding and dropping a group of two signals from a multiplexed group of 16 signals. OADF module 1200 includes a 1×8 WDM 1210 for demultiplexing the signal into eight groups of two, as shown. If, for example, groups one and eight are to be dropped and added, then a 2×2 IOADF 530 can be coupled to each of the two signal groups. An 8×1 WDM 1220 can then multiplex the eight signal groups back into a single signal.

As the above description indicates, the OADF module of the present invention can be modified to add and drop any number or combination of a multiplexed input signal. By expanding the WDMs, smaller groups of signals can be added and dropped for increased selectivity. The addition of additional IOADFs allows the desired one or ones of the groups to be added and dropped. However, if large groups of signals are to be added and dropped, the size of the OADF module can be reduced because the size of the WDM can be reduced.

Figure 13:
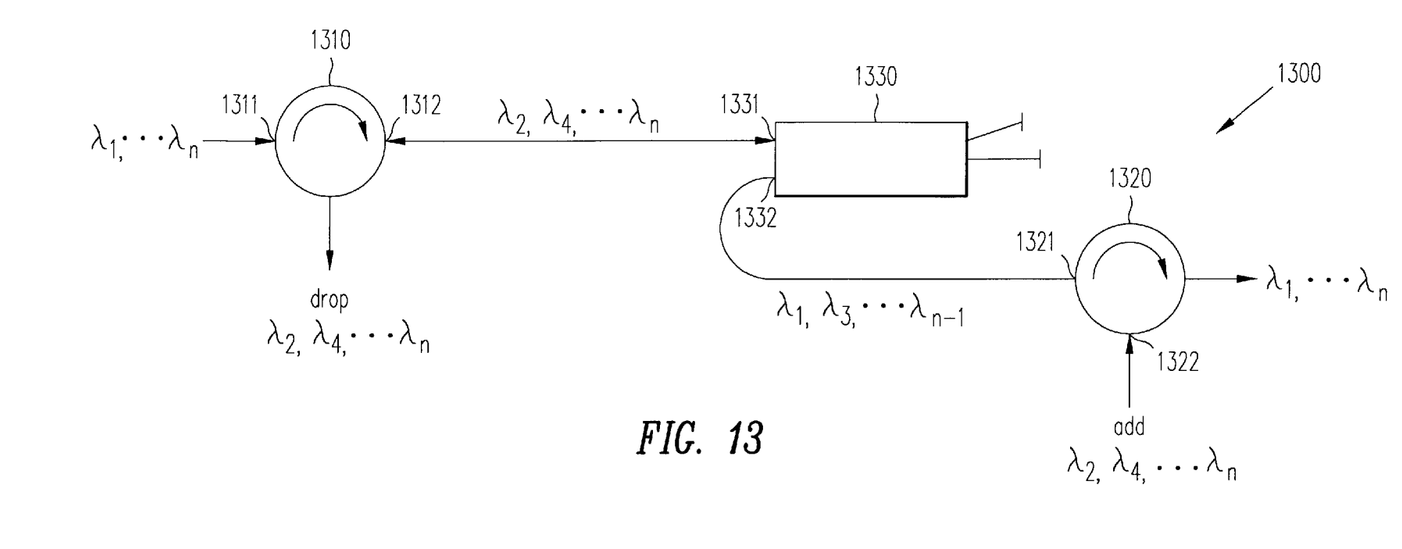
FIG. 13 shows a general block diagram of an OADF module according to another embodiment of the present invention.

FIG. 13 shows an OADF module 1300 for dropping multiple channels using a single filter according to another embodiment of the present invention. OADF module 1300 includes a first optical circulator 1310, a second optical circulator 1320, and a multi-window filter 1330 coupled between the first and second circulators. The multiplexed signal of channels at wavelengths $\lambda_1$ to $\lambda_n$ is coupled to a first input/output (I/O) port 1311. The signal passes through circulator 1310 via a second I/O port 1312 and to a terminal 1331 of filter 1330. Filter 1330, in one embodiment, is an unbalanced Michelson interferometer, as will be described below. The signal travels through filter 1330 and is reflected back through terminals 1331 and 1332. The signals at terminals 1331 and 1332 are complementary, e.g., one set of signals has channels at $\lambda_1$, $\lambda_3$, ..., $\lambda_{n-1}$ (if n is even or to $\lambda_n$ if n is odd), while the other set has channels at $\lambda_2$, $\lambda_4$, ..., $\lambda_n$ (if n is even or to $\lambda_{n-1}$, if n is odd). FIG. 13 shows channels at $\lambda_2$, $\lambda_4$, ..., $\lambda_n$ traveling from terminal 1331 back to circulator 1310, where the signals are dropped and routed to desired destinations. The other set of channels at $\lambda_1$, $\lambda_3$, ..., $\lambda_{n-1}$ are sent via terminal 1332 to a first I/O port 1321 of circulator 1320. A second I/O port 1322 is coupled to a signal to be added, e.g., with channels at $\lambda_1$, $\lambda_3$, ..., $\lambda_{n-1}$. Circulator 1320 then combines the signals at I/O ports 1321 and 1322 to a single signal stream with channels at $\lambda_1$ to $\lambda_n$ at a third I/O port 1323.

Figure 14:
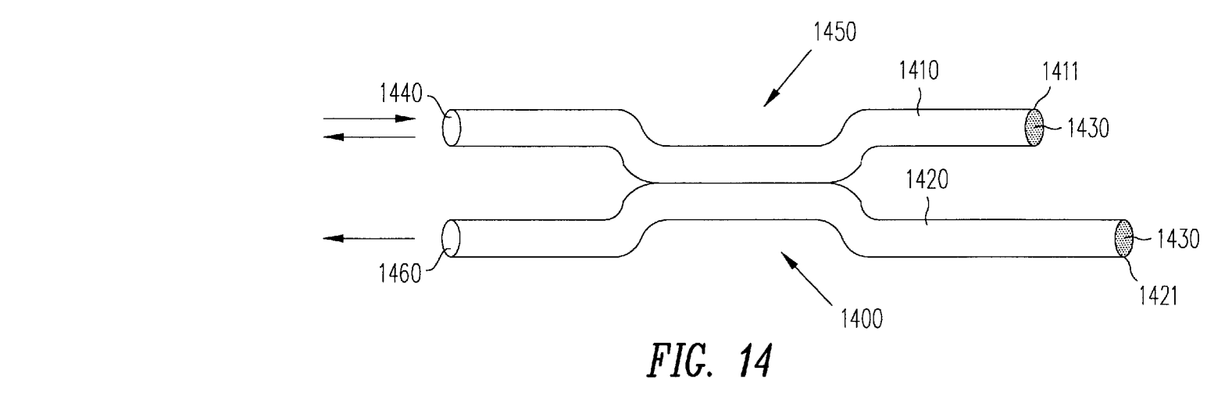
FIG. 14 shows an unbalanced Michelson Interferometer for use as a filter for the OADF module of FIG. 13.

FIG. 14 shows one embodiment of filter 1330, formed as an unbalanced Michelson Interferometer (UMI) 1400, as disclosed in commonly-owned U.S. patent application Ser. No. UNKNOWN, entitled "Fused-Fiber Multi-Window Wavelength Filter Using Unbalanced Michelson Interferometer", filed Jun. 7, 1999 and bearing and which is incorporated by reference in its entirety. UMI 1400 includes a fused-fiber coupler with fiber portions 1410 and 1420 having different optical path lengths and end terminals 1411 and 1421 having a high reflective coating 1430 to reflect the transmitted signal. Reflective coating 1430 can be a metal, such as gold (Au), silver (Ag), or aluminum (Al), or a dielectric, such as an oxide, fluoride, or sulfide, where the coating is characterized by a high reflectivity at the operating wavelength of the filter. Reflective coating 1430 can be applied or coated directly onto polished end terminals 1411 and 1421, or in other embodiments, reflective coating 1430 can be first applied to a separate structure, such as fused silica or glass, and the structure then secured to end terminals 1411 and 1421.

The fused-fiber coupler is typically a 3-dB coupler, which divides the power entering the coupler (e.g., at a terminal 1440) equally at the output of a coupling region 1450, i.e., the power of the signal traveling out of coupling region 1450 is reduced by a factor of two from the signal power entering coupling region 1450. Each signal travels along fiber portion 1410 or 1420 until each arrives at respective end terminals 1411 or 1421, at which time, the signals are reflected back along fiber portions 1410 and 1420 toward coupling region 1450. Because of the different optical path lengths of fiber portions 1410 and 1420, the two optical signals arrive at coupling region 1450 at different times and are phase-shifted. The different optical path lengths can be achieved in a variety of ways, such as, but not limited to, varying the actual lengths of the fibers, using fibers or portions of fibers with different refractive indexes, or a combination of the above. The two signals exiting the UMI at terminals 1440 and 1460 are complementary, e.g., with channels at $\lambda_1$, $\lambda_3$, ..., $\lambda_{n-1}$, and channels at $\lambda_2$, $\lambda_4$, ..., $\lambda_n$. Thus, the OADF module of FIG. 13 allows multiple even or odd channels to be dropped and added utilizing only one filter, thereby providing benefits such as reduced signal loss due to leakage from multiple filters.

The above-described embodiments of the present invention are merely meant to be illustrative and not limiting. It will thus be obvious to those skilled in the art that various changes and modifications may be made without departing from this invention in its broader aspects. Therefore, the appended claims encompass all such changes and modifications as fall within the true spirit and scope of this invention.

We claim:

1. An optical add/drop filter device, comprising:

an optical demultiplexer having a first input terminal and a plurality N output terminals, wherein each of the N output terminals outputs a group of k channels, k being greater than one;

an optical multiplexer coupled to the demultiplexer, the multiplexer having N input terminals and a first output terminal; and an optical filter having an input terminal, an add terminal, an output terminal, and a drop terminal, wherein the input terminal is coupled to a first one of the N output terminals outputting a first group of k channels, the add terminal is coupled to a second group of k channels, the output terminal outputs the second group of k channels to a first one of the N input terminals, and the drop terminal outputs the first group of k channels.

2. The device of claim 1, wherein the optical filter is an unbalanced Mach-Zehnder Interferometer.

3. The device of claim 1, wherein the first input terminal of the demultiplexer is coupled to an n-channel multiplexed signal, N is equal to $2^m$, and k is equal to $n/2^m$.

4. The device of claim 1, further comprising at least one additional optical filter coupled between a corresponding one of the N output and N input terminals.

5. The device of claim 1, wherein the first and second group of k channels represent the same signal.

6. The device of claim 2, wherein the unbalanced Mach-Zehnder Interferometer comprises:

a first fiber portion coupled to the input terminal;

a second fiber portion coupled to the add terminal;

a third fiber portion coupled to the output terminal;

a fourth fiber portion coupled to the drop terminal, wherein the third and fourth fiber portions have different optical path lengths; and a fused region coupling the first, second, third, and fourth fiber portions.

7. The device of claim 1, wherein the demultiplexer and the multiplexer are wavelength division multiplexers (WDMs).

8. The device of claim 7, wherein each WDM comprises at least one 1×2 WDMs.

9. The device of claim 8, wherein each WDM comprises a series of cascaded 1×2 WDMs.

10. An optical add/drop filter device, comprising:

a first optical circulator having a first input port, a drop port, and an input/output (I/O) port;

a second optical circulator having a second input port, an add port, and an output port; and an optical filter having an I/O terminal coupled to the first I/O port and an output terminal coupled to the second input port, wherein an n-channel multiplexed signal is input to the I/O terminal, a first n/2-channel signal is output from the I/O terminal and dropped from the drop port, and a complementary second n/2-channel signal is output from the output terminal and combined with a third n/2-channel signal from the add port.

11. The device of claim 10, wherein the optical filter is an unbalanced Michelson Interferometer.

12. The device of claim 11, wherein the unbalanced Michelson Interferometer comprises:

a first fiber portion coupled to the first I/O port;

a second fiber portion coupled to the second input port;

a third fiber portion having a first reflective end;

a fourth fiber portion having a second reflective end, wherein the third and fourth fiber portions have different optical path lengths; and a fused region coupling the first, second, third, and fourth fiber portions.

13. The device of claim 10, wherein the first and third n/2-channel signal represent the same signal.

14. The device of claim 10, wherein the first n/2-channel signal has signal components at wavelengths $\lambda_2, \lambda_4, \ldots, \lambda_n$.

15. The device of claim 10, wherein the second n/2-channel signal has signal components at wavelengths $\lambda_2, \lambda_4, \ldots, \lambda_n$.

* * * * *